United States Patent
Gasparini

(12) 
(10) Patent No.: US 6,732,559 B2
(45) Date of Patent: May 11, 2004

(54) INTEGRATING DEVICE TO DETECT AND RECOVER THE DEFORMATION OF SHOULDERS IN A PRESS-BENDING MACHINE

(76) Inventor: Luciano Gasparini, Via Storti, 11, 31036 Istrana (IT)

( * ) Notice: Subject to any disclaimer, the term of this patent is extended or adjusted under 35 U.S.C. 154(b) by 16 days.

(21) Appl. No.: 10/174,780

(22) Filed: Jun. 20, 2002

(65) Prior Publication Data

US 2003/0005735 A1 Jan. 9, 2003

(30) Foreign Application Priority Data

Jul. 6, 2001 (IT) .................................. TV2001A0091

(51) Int. Cl.$^7$ ............................................. B21C 51/00
(52) U.S. Cl. .................... 72/31.1; 72/20.1; 72/31.01; 33/710; 100/99
(58) Field of Search ........................ 72/20.1, 31.01, 72/31.1, 31.11, 389.1, 389.3; 100/79, 230; 33/706, 707, 710

(56) References Cited

U.S. PATENT DOCUMENTS

| | | | | |
|---|---|---|---|---|
| 3,142,718 A | * | 7/1964 | Rantsch et al. | 356/616 |
| 3,702,502 A | * | 11/1972 | Kelleher | 33/627 |
| 5,293,767 A | * | 3/1994 | Sartorio | 72/311 |
| 5,711,084 A | * | 1/1998 | Spanner et al. | 33/706 |
| 6,065,221 A | * | 5/2000 | Wang | 33/707 |

* cited by examiner

Primary Examiner—Ed Tolan
(74) Attorney, Agent, or Firm—Harrison & Egbert

(57) ABSTRACT

Integrating device to detect and recover the deformation of shoulders in a press-bending machine, including an optical ruler joined to the beater and reading trolley, pulled back elastically, and stressed by the false shoulder. The device provided for the false shoulder is made up of a rod perpendicular to the beater, which on one side is hinged to the shoulder of the machine, while on the opposite end, oscillating and facing the beater. It is stressed by the arm joined to the reading trolley of the optical ruler. The rod provides a slider in connection with an underlying plane plate that is part of the false shoulder.

8 Claims, 5 Drawing Sheets

INTEGRATING DEVICE TO DETECT AND RECOVER THE DEFORMATION OF SHOULDERS IN A PRESS-BENDING MACHINE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention refers to an integrating device to detect, recover and compensate the deformation of shoulders, in a press-bending machine.

The innovation finds particular even if not exclusive application in the field of machine tools.

BACKGROUND OF THE INVENTION

Press-bending machines, as known, are widely used in the engineering industry, and particularly in the working of metal sheets, to obtain, for example, differently shaped longitudinal sections, sometimes with the possibility of being each re-taken and subjected again to a cycle of press-bending.

Operatively, a press-bending cycle consists in the vertical descent of a tool, until it presses on the underlying metal sheet rested on the matrix, in carrying out the bending, and then, at the end, in proceeding with the ascent, up to a primary position. For carrying out the mentioned steps, the machine consists of two parts, respectively a first one, dynamic, generally engaging the upper part, and a substantially static part, constituting the underside of the machine placed perpendicular to the dynamic part. As far as the first dynamic part is concerned, in the execution of a press-bending cycle, a tool is provided for, made up of a differently shaped punch, also of the interchangeable type, which, supported by a beater or upper cross-piece, makes just one movement, along a vertical axis, of to and fro. The said movement is ensured by at least two oil-dynamic end-cylinders, which determine the descent, the possible stop and ascent of the beater that supports the tool longitudinally. Every cylinder group, in a traditional forming press, is joined and made integral with the frame or static body of the machine, and, in this case, to a corresponding side or side-shoulder of the frame of the press.

These characteristics give origin, during the pressing phase, to a multitude of rather strong forces, which develop in various known directions to engage the different parts of the machine, deforming them temporarily. Furthermore, some of these forces above all, end up modifying the shape of each shoulder even in a non-uniform way. It follows that during the execution phase of a press-bending cycle, a widespread deformation takes place, which affects in a negative way the qualitative result of the working required.

Tests carried out on the test stand, have evidenced that this characteristic temporary deformation of each shoulder, has its own logical progression the more the punch presses down on the sheet, and it is always proportional to the thickness of the sheet and to the type of material.

It therefore follows that it is necessary to have a control system that allows to detect the deflection of the shoulders, in order to intervene in the first stages of the working process. Then it is a question of correctly prearranging the forming press, in order that it can carry out a manufacturing cycle that will allow to achieve the predetermined bending angle with precision.

Actually, two techniques are known for solving the problem, which however do not seem completely satisfactory.

In one case, the movement of the beater or punch carrying cap of the synchronized bending presses is given by two hydraulic cylinders, placed to the sides of the first and integral with the shoulders, which assume the name of the two axes. These axes, are checked sideways by optical rulers where a small reading trolley slides. The reading trolley is hinged, through a rod, to the upper end of a flexion recovery shoulder or false shoulder, superimposed to the shoulder, which is made integral, only on the underside, with the cross-piece, with the platform and with the matrix.

Considering the fact that the false shoulder is integral with the cross-piece, with the platform and with the matrix, the punch should, both when under pressure and when load-less, maintain a locating spot in correspondence with the bottom dead center. Intuitively, this should take place because the false shoulder is not engaged to the shoulder.

A second system, not shown, but just as common, is the solution originally suggested by the Beyler Company. It refers to an electronic card consisting of a data base, cooperating with the logical unit of the machine, where a great number of data relative to the known deformations is stored, therefore including the deformation of shoulders, in relation to an entire series of parameters, namely: extension of the carpentry, extension of optical lines, changes on the viscosity of the oil, electric de-compensations, de-compensations in the control of the valves. This data have been previously acquired on the basis of a series of tests and subsequently transferred to the database. The processing and the comparing of these by a logical unit with others values, allows to define, in a manufacturing cycle of the sheet, ascribable theoretic values foreseeable in the localized deformation of the shoulders that therefore will be conveniently recovered.

Therefore there is the need for companies to find alternative and more effective systems than the ones described above.

A purpose of the present proposal is also to avoid the abovementioned drawbacks.

BRIEF SUMMARY OF THE INVENTION

This and other purposes are achieved with this innovation according to the characteristics as in the included claims, solving the mentioned problems, with an integrating device to detect and recover the deformation of shoulders, in a press-bending machine, including an optical ruler joined to the beater and a reading trolley, pulled back elastically, stressed by the false shoulder; said device provided for above the false shoulder, being made up of a rod placed perpendicular to the beater, which is hinged to the shoulder of the machine on one side, while the opposite end, oscillating and directed towards said beater, is stressed by the arm joined to the reading trolley of the optical ruler, and furthermore in which said rod provides a sliding device in correspondence with an underlying plane plate that is part of the false shoulder.

The considerable creative contribution, found in the proposal now described, determines an immediate technical progress, allowing to obtain various advantages.

First of all, the system gives the user the possibility of finding the desired angle in a fast way, with intuitable and extremely simple operations. More particularly, first it carries out tests on a small piece to then take it on to a definite piece, even along the total length of the machine or differently placed along the fold-line (right, left and center). All this independently of the bending force, that, as known, varies according to what piece has to be bent.

Secondly, this system has the advantage of correcting automatically the different flexions noticeable from one shoulder to the other, caused by variations in the thickness of the material with which the shoulders are obtained, by the diversity of the materials, as well as by continuous variations in the temperature of the environment where the said machine is made operative.

Amongst the peculiarities of this invention, it is important to point out the fact that, under the executive point of view, having two metal-sheets of the same length but with a different bending section, the result between the two pieces is maintained constant.

An additional advantageous point refers to the lack of particular complications in the device; this implies almost an absence of maintenance with rather low costs, relatively to the construction and to installation. The particularity of the device, additionally, also allows installations on already existing machines, favoring an increase in quality and, as a whole, in the works in progress.

These advantages have the all but negligible value of obtaining a product with a good technological content, functional and extremely reliable, even if submitted to particular working conditions.

BRIEF DESCRIPTION OF THE SEVERAL VIEWS OF THE DRAWINGS

Other advantages will appear from the following specific description of some preferred embodiments, with the aid of the included schematic drawings, whose details of execution are not to be considered restrictive, but only illustrative.

Finally.

DETAILED DESCRIPTION OF THE INVENTION

Figure 1:
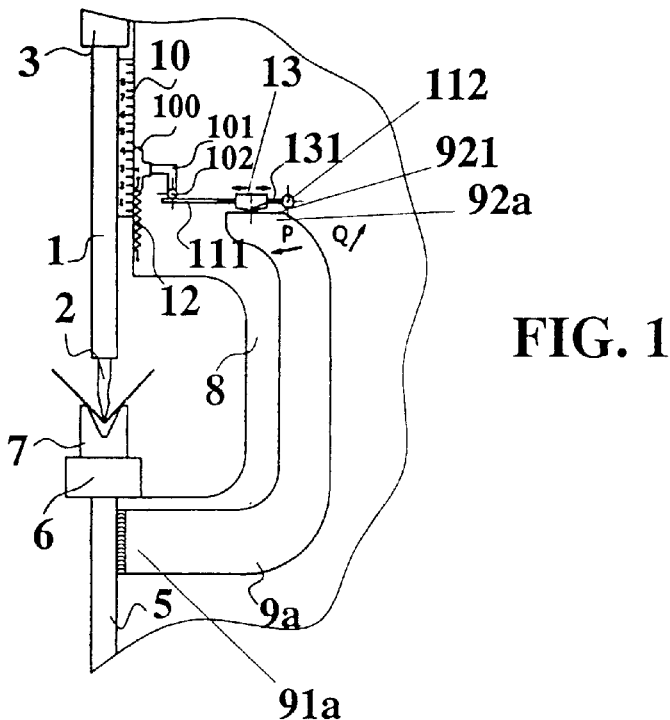
FIG. 1, represents a side view of a portion of the press-bending machine, to which a device for the control of the deflection of the shoulder is joined, taken in correspondence with the working area.
Figures 2, 3:
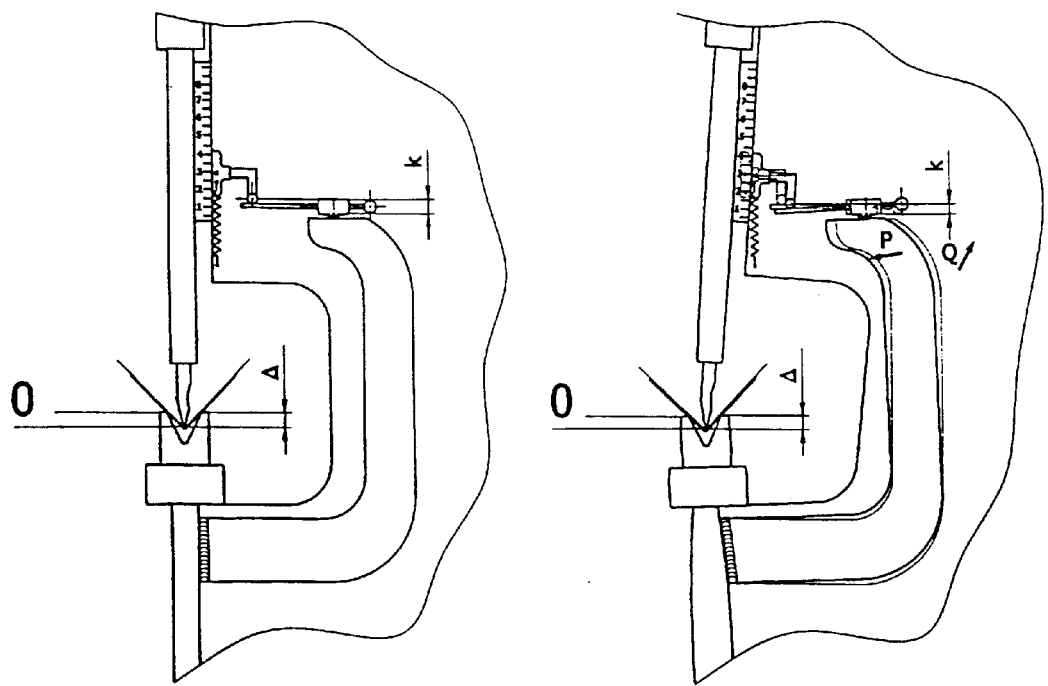
FIG. 2, is always a side view of a portion of a press-bending machine as in the previous figure, comprehensive of the device for the control of the deflection of the shoulder, represented in a load-less working condition.
FIG. 3, is again a side view of a portion of a press-bending machine as in FIG. 1, but represented in an effective working condition.

Also with reference to the figures, one can detect that a press-bending machine (A), provided with a device for the control of the deflection of the shoulder, includes an upper beater (1), vertically mobile with respect to the frame, to the lower end of which an interchangeable type tool is associated longitudinally, realizing the punch (2). Always the machine (A), provides at the two ends a cylinder group for each side (3, 4), which being synchronous, determine the downward and upward vertical movement of the beater (1) towards the underlying cross-piece (5), which supports a platform (6) which supports the matrix (7), also of the interchangeable type.

With the purpose of detecting and later on allowing the recovery of the deflections that both the shoulders (8) undergo, during the execution of a press-bending cycle, for example of a metal sheet (Z) interposed between the matrix (7) and the punch (2), false shoulders or flexion recovery shoulders (9a, 9b) are provided for each of said shoulders (8), set on the side facing towards the exterior.

Every false shoulder (9a, 9b), composed of a robust metallic body plate on both the sides, presents a characteristic "C" shape where the empty part faces towards the tool (2) and the underlying matrix (7). As regards the fixing of the false shoulder (9a, 9b), it is provided for only in correspondence with the lower end (91a, 91b), in such a way as to make it integral with the lower cross-piece (5), as it is directly joined to the latter, and integral with the bed (6) and the matrix (7).

There is also an optical ruler (10) joined to the beater (1), cooperating with a reading trolley (100). This reading trolley (100), instead of being directly fixed to the false shoulder (9a, 9b), as seen in previous solutions, is now equipped with a small cantilevered arm (101), with a bearing (102) at the end which insists in correspondence with the extremity (111, 141) of a rod (11, 14) for the neutralization of horizontal end plays hinged in (112, 143) to the shoulder (8). The necessary and constant contact of the bearing (102) along the rod (11, 14), that in this case is of the type made of harmonic steel, is ensured by the action of an underlying elastic means (12), which on one side is engaged to the shoulder (8) and on the other to the reading trolley (100).

In a first proposition of the invention, with the purpose of controlling the oscillation of the rod that neutralizes the end play (11), along the latter a movable body (13) is provided for. This movable body (13), which is nothing less than a trolley, in the underside is provided with a point of support (131), for example a bearing, which slides along the flat edge of the upper end (921) of the false shoulder (9a). In this way, the rod (11) takes on the function of a second-degree lever, so that when the position of the movable body (13) varies, the width of the movement of the rod varies proportionally to the deformation of the shoulder due to the pressure exerted by the cylinders for the bending.

Operatively, to make sure that the point 0 does not change when the pressure varies, one will have to act on the movable body (13). This action determines the variation of the value (K) until point 0 is not maintained constant even when variations of the pressure take place.

The described condition, in such a case, is reached thanks to the movement in opposite directions (P, Q) of the shoulder (8) and of the false shoulder (9a), which contextually determines the movement of the movable body (13) along the plane (921). Thanks to the sliding of the movable body (13) with respect to the plane (921) of the extremity (92a) of the false shoulder (9a), it is possible to maintain the value of the optical ruler (10) and to get the beater (1) down until it reaches the position 0 (value reached in a load-less condition) proportionally to the pressure exerted on the beater (1).

Figure 4:
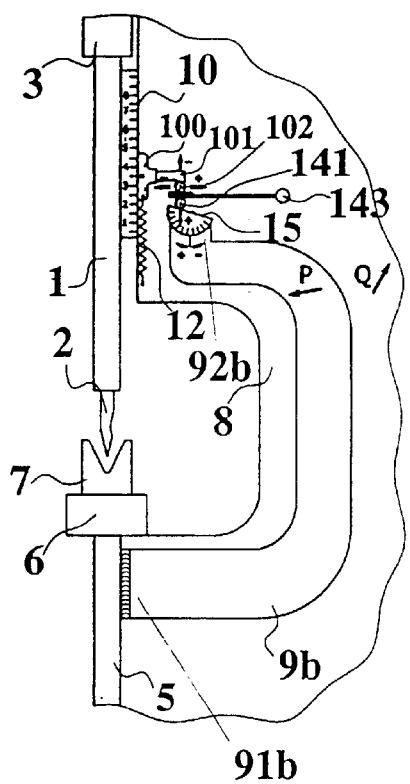
FIG. 4 shows a side plan view of a portion of a press-bending machine, with a different version of the device for the control of the deflection of the shoulder.
Figures 5, 6:
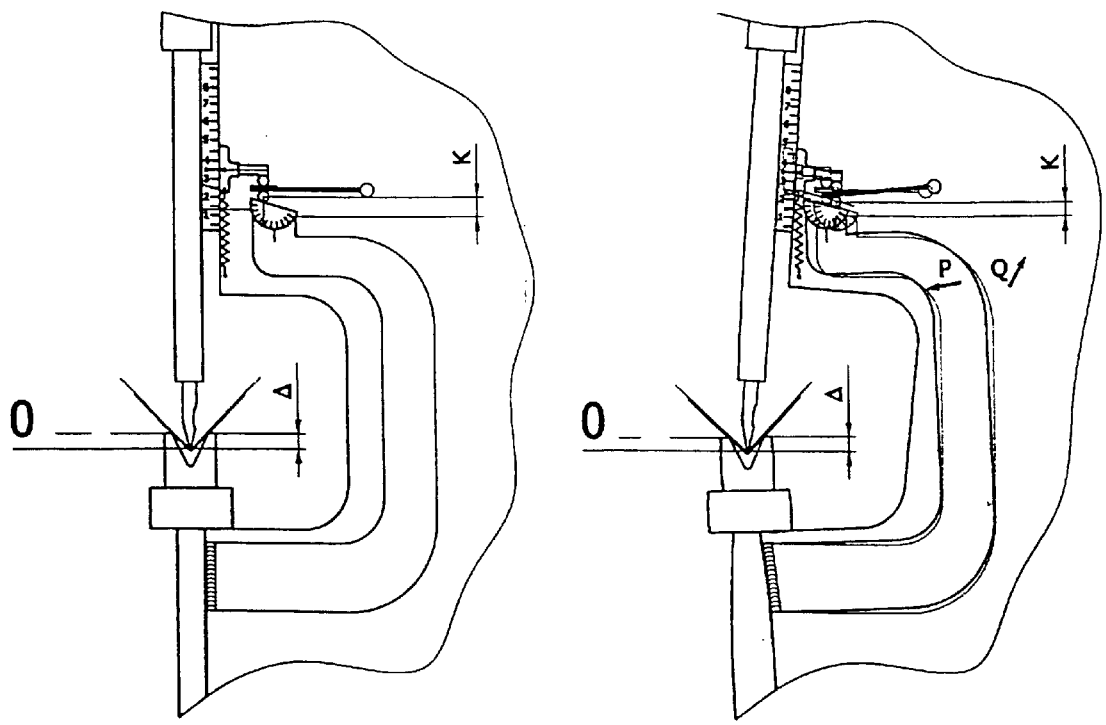
FIG. 5, is a side view of a portion of a press-bending machine as in the previous figure, represented in a load-less working condition.
FIG. 6, is again a side view of a portion of a press-bending machine as in FIG. 4, but represented in an effective working condition.
Figure 7:
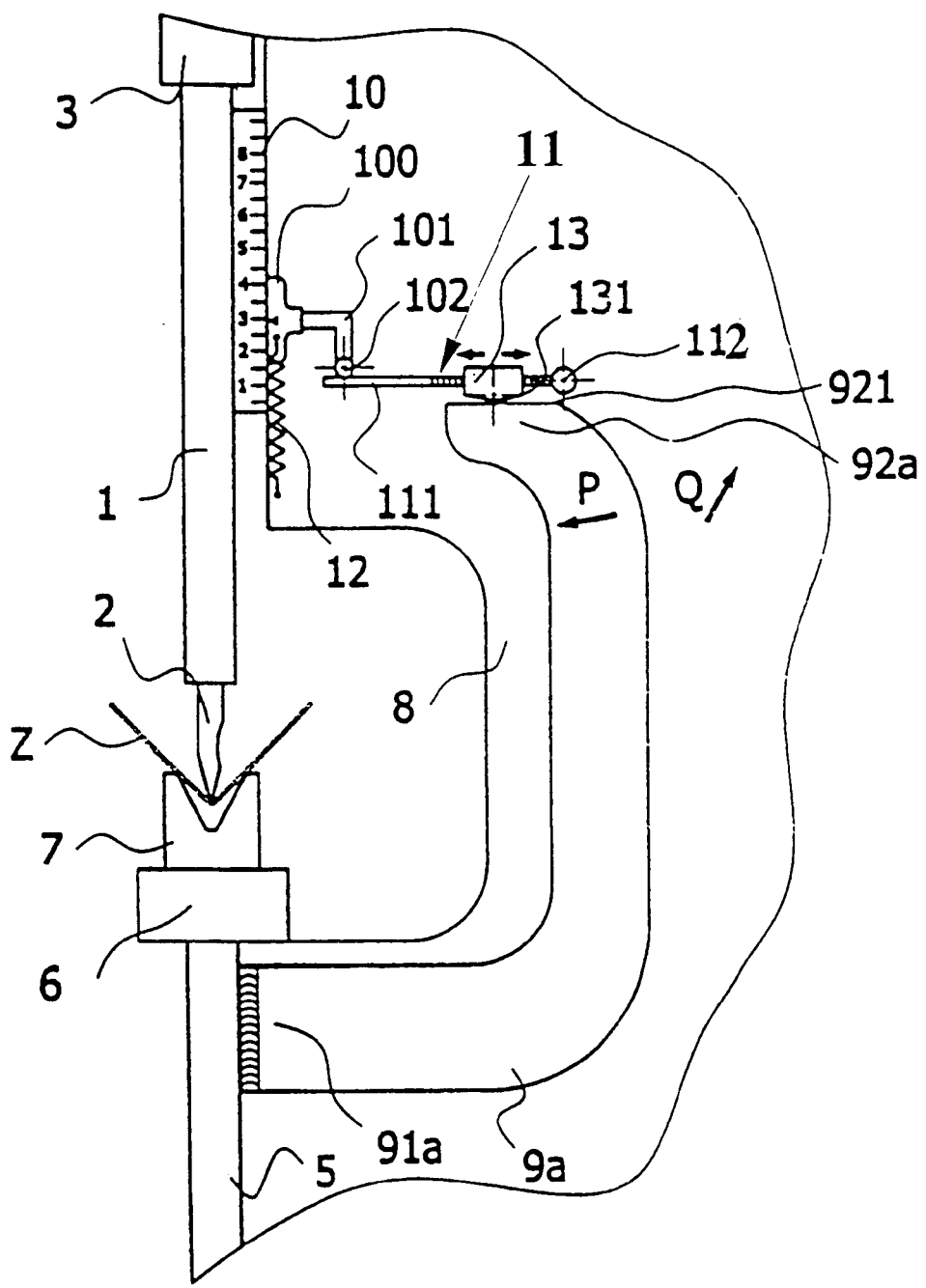
FIG. 7 is an enlarged side view of the detail as in FIG. 1, of a portion of the press-bending machine, to which a device for the control of the deflection of the shoulder is joined, taken in correspondence with the working area.
Figures 8, 9:
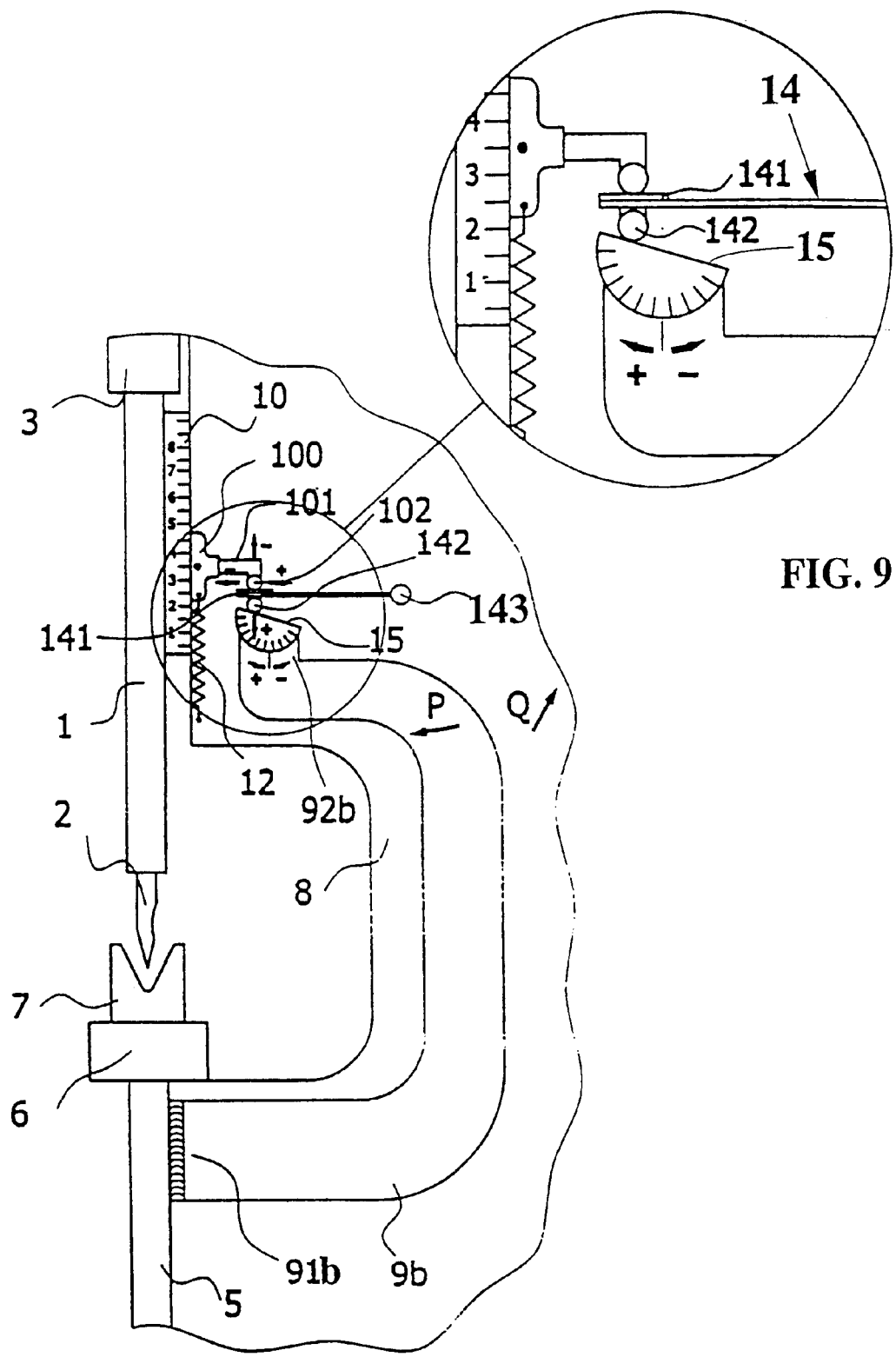
FIG. 8 is an enlarged side view of the portion of press-bending machine of FIG. 4, which represents the different version of the device for the control of the deflection of the shoulder.
FIG. 9 is an enlarged schematic view of a detail of the portion of press-bending machine of FIG. 4.
Figure 10:
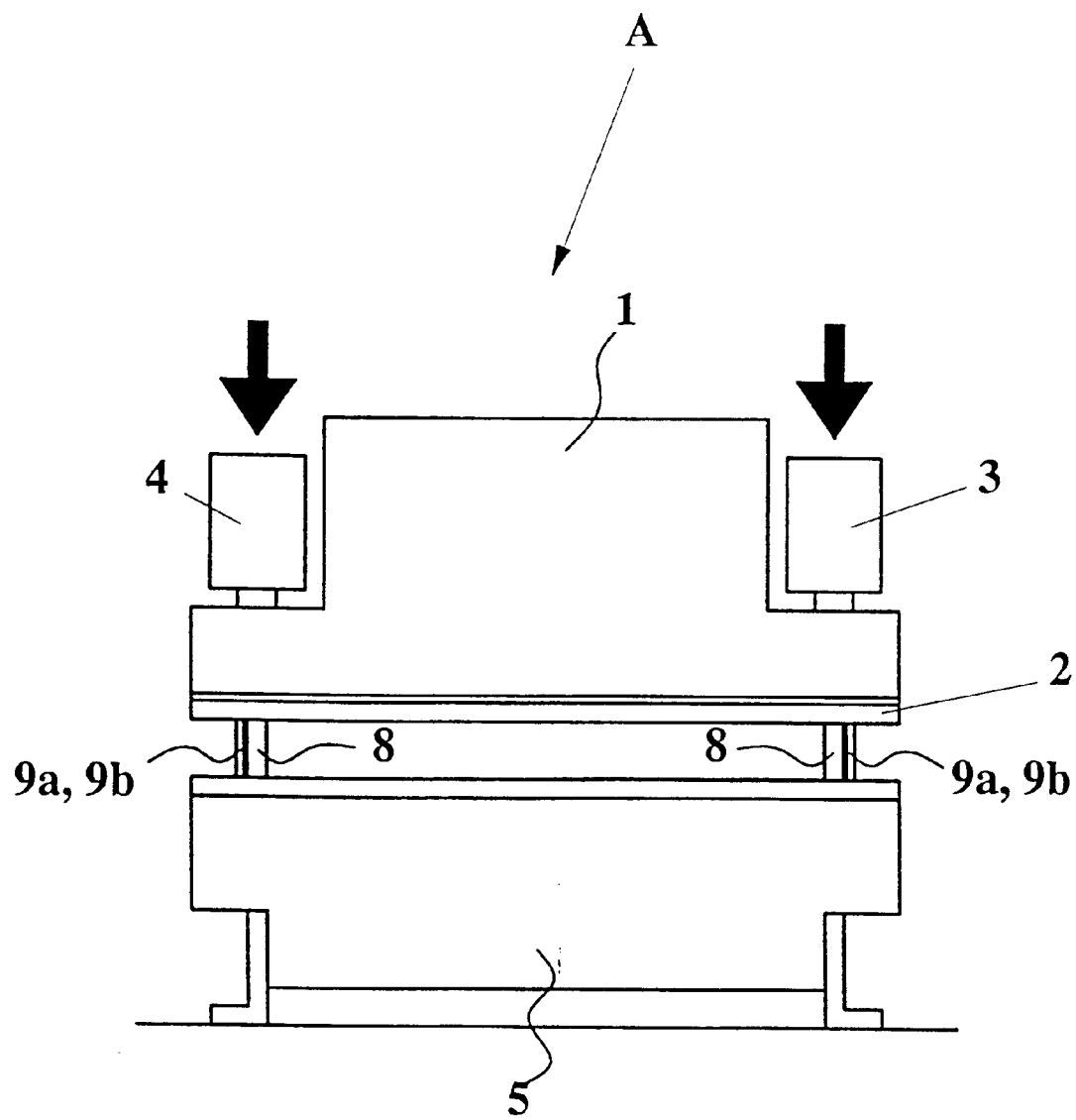
FIG. 10, is an overall and frontal view of a press-bending machine.

A different version of the mentioned device is represented in the following FIGS. 4, 5 and 6. Also in this hypothesis, with the purpose of detecting and recovering the flexions that both the shoulders (8) undergo, during the execution of a press-bending cycle, for example of a metal sheet (Z) interposed between the matrix (7) and the punch (2), false shoulders or flexion recovery shoulders (9b) are provided, for each of the shoulders (8), set on the side facing towards the exterior.

Each of the two false shoulders (9b), is composed by a robust metallic body, flat on both sides, with a characteristic "C" shape where the hollow part faces towards the tool (2) and the underlying matrix (7). Also in such case, the fixing of the false shoulder (9b) is provided for only in correspondence with the lower end (91b), in such a way to make it integral with the cross-piece (5), as it is directly-joined to it, and integral with the bed (6) and the matrix (7).

An optical ruler (10) is always present, joined to the beater (1), cooperating with a reading trolley (100). The said reading trolley (100), is equipped with a small arm (101), with at the end a bearing (102) which insists in correspondence of the extremity (141) of a steel rod (14) for neutralizing horizontal end games. The necessary and constant contact of the bearing (102) along the top-side of the rod (14) is ensured by the action of an elastic means (12) which, on one side, is engaged to the shoulder (8), on the other to the reading trolley (100).

Furthermore, one detects that above the extremity (92b) of the false shoulder (9b), the said end game neutralizing rod (14) is hinged in correspondence with point (143) to the shoulder (8). This rod is provided, along the bottom side in correspondence with the extremity (141), with a bearing (142), which engages along an adjustable plane (15), provided with reference graduations with relation to the measuring of degrees allowing to establish a more or less stronger inclination. In more detail, said adjustable plane (15) is hinged in correspondence with the higher extremity (92b) of the false shoulder (9b), which has a short extension section directed vertically, for the support of said adjustable plane (15).

Operatively, during pressing, the false shoulder (9b) moves in direction (P) and the shoulder (8) in the opposite direction (Q), so that, as the rod (14) is anchored to the shoulder (8), the bearing (142) runs along the adjustable plane (15) creating therefore a movement along a vertical direction (K) proportional to the power at work.

The plane (15), is inclined until the maintenance of point 0 of the punch (2) is achieved, in a practical way, at any working pressure. This is thanks to the movement in opposite directions of (P) and (Q) which makes the bearing (142) run along the inclined plane (15). Thanks to the sliding of the bearing (142) with respect to the plane (15) it is possible to maintain the value of the optical ruler and get the beater (1) down until it reaches the position 0 [value reached when load-less] proportionally to the pressure exerted on the beater (1).

After accurately setting-up the angle, the system recovers the anomalies of deformations and flexions of the shoulders (8) due to movements (P, Q) and of compressions therefore maintaining point 0 (value reaching point) constant whatever the pressure, both in a load-less condition and under maximum load.

I claim:

1. A device for detecting a deformation of shoulders in a press brake comprising:
    a machine having a shoulder and a beater;
    an optical ruler joined to said beater;
    a reading trolley having an arm extending therefrom; and
    a ram hinged on one end to said shoulder, said ram being stressed by said arm of said reading trolley, said reading trolley comprising a rod acting perpendicular to said ram, said rod having a sliding means for moving in correspondence with an underlying plane part, said underlying plane part being part of a false shoulder.

2. The device of claim 1, said reading trolley positioned on top of said false shoulder.

3. The device of claim 1, said reading trolley having said arm with a bearing at an end thereof, said reading trolley having an elastic recovering means which has one side engaged to the shoulder of said machine and an opposite side engaged with said reading trolley.

4. The device of claim 1, said rod having a movable body along an end thereof, said movable body having a point of support in an underside thereof, said point of support slidable along a flat edge of a higher extremity of said false shoulder.

5. The device of claim 1, further comprising:
    a neutralizing rod positioned above an extremity of said false shoulder, said neutralizing rod being hinged to the shoulder of said machine, said neutralizing rod having a bearing at an end thereof on a bottom side thereof, said bearing extending along an adjustable plane that is hinged to the false shoulder.

6. The device of claim 5, said adjustable plane being hinged in correspondence with the extremity of the false shoulder.

7. The device of claim 6, said adjustable plane being inclined.

8. The device of claim 1, said rod being of a harmonic steel material.

* * * * *